(12) United States Patent
Koellner

(10) Patent No.: US 7,398,012 B2
(45) Date of Patent: *Jul. 8, 2008

(54) METHOD FOR POWERING MINING EQUIPMENT

(75) Inventor: Walter Koellner, Suwanee, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 9 days.

This patent is subject to a terminal disclaimer.

(21) Appl. No.: 11/126,590

(22) Filed: May 11, 2005

(65) Prior Publication Data

US 2005/0254801 A1 Nov. 17, 2005

Related U.S. Application Data

(60) Provisional application No. 60/570,278, filed on May 12, 2004.

(51) Int. Cl.
H02P 7/285 (2006.01)

(52) U.S. Cl. .................. 388/830; 318/139; 318/254; 318/434

(58) Field of Classification Search .......... 318/254, 318/599, 138, 139, 434, 376, 801; 388/800–900; 307/39, 151; 180/65.1; 320/104
See application file for complete search history.

(56) References Cited

U.S. PATENT DOCUMENTS

| | | | | | |
|---|---|---|---|---|---|
| 4,129,809 | A | * | 12/1978 | Rosa | 318/293 |
| 4,743,814 | A | * | 5/1988 | Sankey | 318/140 |
| 5,412,293 | A | * | 5/1995 | Minezawa et al. | 318/376 |
| 5,932,979 | A | * | 8/1999 | Sun | 318/254 |
| 5,998,960 | A | * | 12/1999 | Yamada et al. | 320/104 |
| 6,075,328 | A | * | 6/2000 | Notohara et al. | 318/254 |
| 6,573,675 | B2 | * | 6/2003 | Schmitz et al. | 318/434 |
| 6,577,087 | B2 | * | 6/2003 | Su | 318/254 |
| 6,864,663 | B2 | * | 3/2005 | Komiyama et al. | 320/104 |
| 6,897,629 | B2 | * | 5/2005 | Wilton et al. | 318/139 |
| 7,024,805 | B2 | * | 4/2006 | Onsager et al. | 37/396 |
| 7,109,605 | B2 | * | 9/2006 | Habu | 307/39 |
| 7,122,979 | B2 | * | 10/2006 | Wilton et al. | 318/138 |
| 7,201,244 | B2 | * | 4/2007 | Johnston et al. | 180/65.5 |
| 7,298,102 | B2 | * | 11/2007 | Sopko et al. | 318/139 |
| 2003/0090225 | A1 | * | 5/2003 | Posma et al. | 318/376 |
| 2004/0145338 | A1 | * | 7/2004 | Nakamura et al. | 318/801 |
| 2004/0207350 | A1 | * | 10/2004 | Wilton et al. | 318/376 |
| 2004/0210356 | A1 | * | 10/2004 | Wilton et al. | 701/22 |
| 2004/0245947 | A1 | * | 12/2004 | Wilton et al. | 318/139 |
| 2005/0162023 | A1 | * | 7/2005 | Habu | 307/151 |
| 2005/0254801 | A1 | * | 11/2005 | Koellner | 388/830 |
| 2005/0263329 | A1 | * | 12/2005 | Kuras et al. | 180/65.1 |
| 2005/0263331 | A1 | * | 12/2005 | Sopko et al. | 180/65.1 |
| 2006/0071860 | A1 | * | 4/2006 | Hozoji et al. | 343/700 MS |

* cited by examiner

*Primary Examiner*—Paul Ip

(57) ABSTRACT

Certain exemplary embodiments can include a static DC electric drive system for mining equipment. The drive system can include: an active front end adapted to receive an AC voltage and output a substantially constant DC voltage; and a DC chopper coupled to the active front end, the DC chopper adapted to receive the substantially constant DC voltage and output a variable DC voltage.

20 Claims, 5 Drawing Sheets

2000

METHOD FOR POWERING MINING EQUIPMENT

CROSS-REFERENCES TO RELATED APPLICATIONS

This application claims priority to, and incorporates by reference herein in its entirety, pending U.S. Provisional Patent Application Ser. No. 60/570,278, filed 12 May 2004.

BACKGROUND

Mining equipment, such as large mining excavators (e.g., shovels, draglines, etc.) typically use relatively large AC and/or DC motors to power the movement of the equipment and/or the movement of material. These motors can include propel motors, hoist motors, swing motors, crowd motors, and/or drag motors, etc. Such motors are typically powered by conventional DC or AC electric drive systems. For example, conventional DC electric drive systems typically use AC-powered rotating Motor-Generator (M-G) sets or static variable speed drives with thyristor rectifiers to change the speed and torque of a DC motor.

Some consider the M-G set systems to be outdated technology, as not energy efficient, and/or as requiring high levels of maintenance. The static DC systems can require switched capacitor banks and/or reactors to provide an acceptable system power factor and/or harmonic filters to pass the harmonic limit requirements set by the electrical power utility. This additional equipment can require space and increase capital costs without contributing to the machine's capacity to move material.

SUMMARY

Certain exemplary embodiments can include a static DC electric drive system for mining equipment. The drive system can include an active front end that can receive an AC voltage and output a substantially constant DC voltage. The drive system can also include a DC chopper coupled to the active front end. The DC chopper can receive the substantially constant DC voltage and output a variable DC voltage, which can control various motors coupled to the drive system.

BRIEF DESCRIPTION OF THE DRAWINGS

A wide variety of potential embodiments will be more readily understood through the following detailed description of certain exemplary embodiments, with reference to the accompanying exemplary drawings in which.

Definitions

Figure 1:
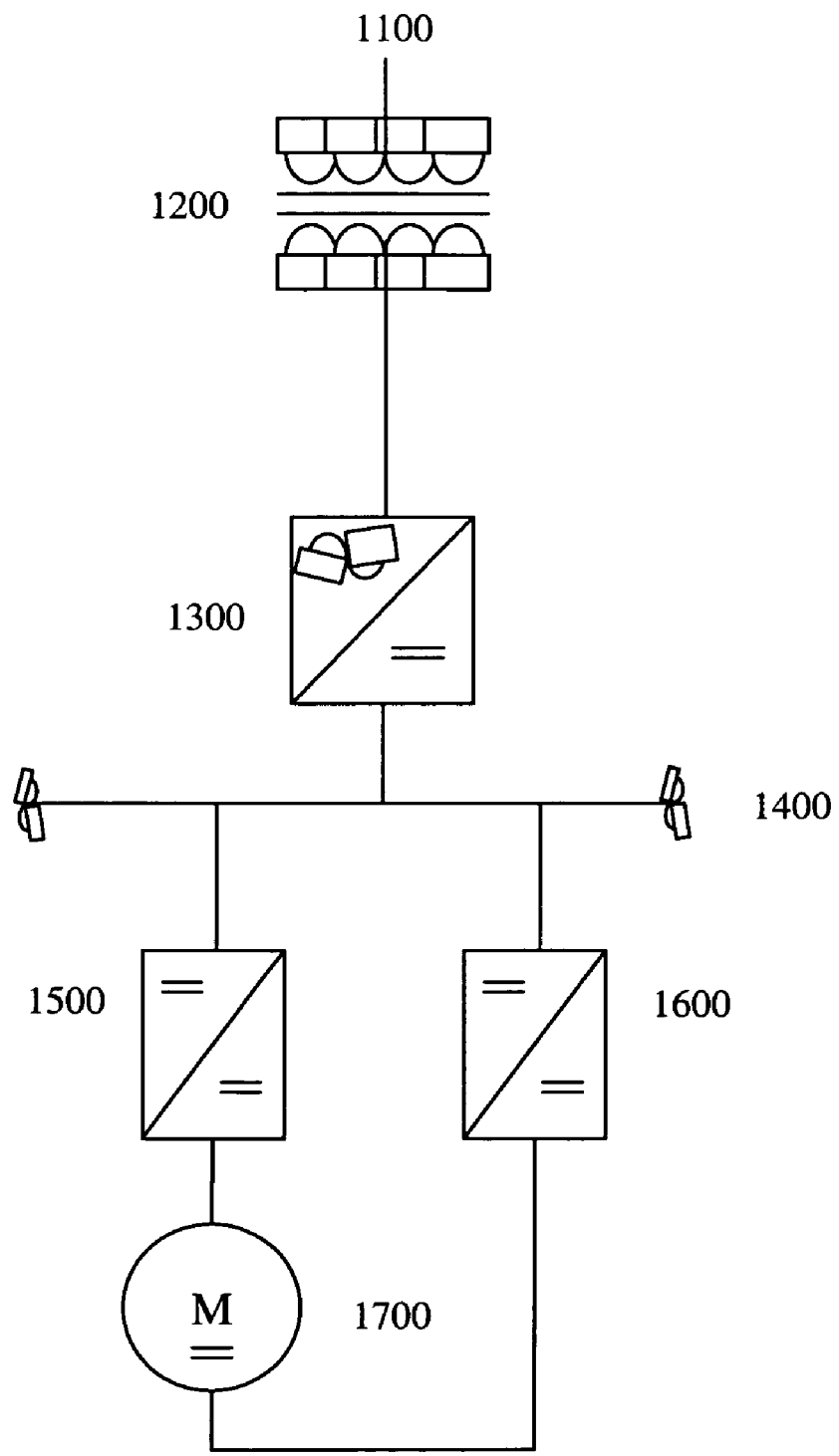
FIG. 1 is a schematic one-line diagram an exemplary embodiment of a system 1000.

When the following terms are used herein, the accompanying definitions apply:

a—at least one.

active—a circuit and/or device that uses transistors, integrated circuits and/or vacuum tubes to perform an action on an electrical source.

active front end (AFE)—a self-commutated, actively controlled line converter; a self-commutated infeed/regenerative feedback unit.

activity—performance of a function.

adapted to—made suitable and/or fit for a specific use and/or situation.

alternating current (AC)—an electric current that reverses direction in a circuit at regular intervals.

anti-parallel arrangement—in opposite directions.

apparatus—an appliance and/or device for a particular purpose.

automatic—performed via an information device in a manner essentially independent of influence and/or control by a user.

can—is capable of, in at least some embodiments.

comprising—including but not limited to.

constant—continually occurring; persistent; and/or unchanging.

continuously—uninterrupted in time, sequence, substance, and/or extent.

control—to exercise authoritative and/or dominating influence over; direct; adjust to a requirement; and/or regulate.

convert—to transform.

couple—to join, connect, and/or link two things together.

crowd—to press, cram, and/or force the loading bucket of a mining excavator into the digging surface.

DC chopper—a device that converts one DC voltage to another DC voltage.

define—to establish the outline, form, and/or structure of.

direct current (DC)—a non-alternating electric current.

drag—to cause to trail along a surface.

dragline—a large excavation machine used in surface mining to remove overburden (layers of rock and soil). A typical dragline casts a wire rope-hung bucket a considerable distance, collects the dug material by pulling (dragging) the bucket toward itself on the ground with a second wire rope (or chain), elevates the bucket, and dumps the material on a spoil bank, in a hopper, and/or on a pile, etc.

drive—a means by which power is transmitted.

duty cycle—a fraction of time a system is actually employed in performing its function; a percentage of time a DC voltage is substantially non-zero. With respect to the excavating machine the time duration between one defined point in operation (e.g. the dumping of the material in the bucket) to the next identical point of operation.

harmonic filter—a device comprising a capacitor bank and an induction coil and that is designed and/or tuned to a predetermined non-linear load to eliminate and/or substantially attenuate a predetermined harmonic current or voltage over a certain frequency range.

hoist—to lift and/or raise.

Insulating Gate Bipolar Transistor (IGBT)—a power semiconductor device that has identical operation to a bipolar transistor, but has a field effect type gate, so that a gate-emitter voltage is applied to make it conductive, no current needs to be injected. When gate-emitter voltage is very low the device switches off. The commutations are typically faster than with a bipolar transistor and typically a little slower than with a MOSFET.

load—an amount of mined earthen material associated with a bucket and/or truck, etc.

machine—a device and/or vehicle adapted to perform at least one task.

material—any substance that can be excavated and/or scooped.

may—is allowed to, in at least some embodiments.

method—a process, procedure, and/or collection of related activities for accomplishing something.

mine—a site from which earthen materials can be extracted.

mining excavator—a machine for excavating material from the earth.

output—to produce, manufacture, and/or generate.

plurality—the state of being plural and/or more than one.

power factor—a ratio of true power to apparent power. A power factor of 1.0 indicates that current and voltage are in phase.

predetermined—established in advance.

propel—to cause to move forward and/or backward.

Pulse Wave Modulated (PWM)—a method of regulating the output voltage of a switching power supply by varying the width and/or time duration, but not the height, of a train of voltage pulses; and/or the modulation of duty cycle of a signal and/or power source to convey information over a communications channel and/or control the amount of power sent to a load.

receive—to take, get, acquire, and/or have bestowed upon.

rectifier—a device that converts AC power to DC power.

set—a related plurality.

shovel—an electrically-powered mining excavator vice adapted to dig, hold, and/or move ore.

speed—a velocity.

static—stationary and/or constant. With respect to a variable speed electric drive this means "without a rotating Motor-Generator set" and/or utilizing "static" electronic switches such as transistors and/or thyristors.

substantially—to a great extent and or degree.

swing—to move laterally and/or in a curve. With respect to a mining excavator the turning of the excavator around its center axis.

system—a collection of mechanisms, devices, data, and/or instructions, the collection designed to perform one or more specific functions.

variable—likely to change and/or vary; subject to variation; and/or changeable.

voltage—(a.k.a., "potential difference" and "electromotive force" (EMF)) a quantity, expressed as a signed number of Volts (V), and measured as a signed difference between two points in an electrical circuit which, when divided by the resistance in Ohms between those points, gives the current flowing between those points in Amperes, according to Ohm's Law.

DETAILED DESCRIPTION

FIG. 1 is a schematic one-line diagram an exemplary embodiment of a system 1000, such as a static DC electric drive system for and/or comprised by a mining excavator (not shown), such as a shovel, dragline, etc. System 1000 can comprise and/or be coupled to a source 1100 of AC power, which can range in voltage from approximately 110 volts AC to approximately 60,000 volts AC, including all values and sub-ranges therebetween, such as, for example, approximately 3000, 6000, 7500, and/or 9000 volts, etc. The AC power can be coupled to a transformer 1200, that can change the voltage to a desired value and/or range, such as for example, approximately 240, 450, 600, 900, and/or 1200 volts, etc. The resulting AC power can be provided to an Active Front End (AFE) 1300, which can comprise one or more active IGBT rectifiers, any of which can comprise an input reactor, 6 IGBT transistors and anti parallel diodes in a 6-pulse bridge configuration, low inductance bus connections, a firing circuit to turn on/off the IGBTs, current and voltage transducers, and/or a digital control circuit, etc. AFE 1300 can receive the AC voltage and output a substantially constant DC voltage, such as to a DC capacitor bus 1400, to which any number of DC choppers 1500, 1600 can be coupled. One or more DC choppers 1500, 1600 can receive the substantially constant DC voltage from DC bus 1400 and output variable DC voltage. Each DC chopper can comprise two IGBT transistors, low inductance bus connections, a firing circuit to turn on/off the IGBTs, current and voltage transducers, and/or a digital control circuit, etc. The DC choppers can take the constant voltage of the DC capacitor bus as an input and use the IGBTs to switch this constant voltage input through to the output. Using pulse width modulation, the constant input voltage input can be transferred into a variable voltage output. Thus, DC choppers 1500, 1600 can be viewed as acting as DC voltage regulators.

For example, a DC chopper can generate a Pulse Wave Modulated (PWM) DC voltage having a duty cycle ("on time") that can be continuously varied to affect the time-averaged voltage output from the chopper. The variable DC voltage can power and/or, via varying the duty cycle, control a speed of, one or more DC motors 1700, such as a hoist motor, a swing motor, a drag motor, and/or a propel motor, etc. Because the system can be regenerative, a DC chopper can be provided in an anti-parallel arrangement wherein a chopper is provided for each current direction.

Thus, certain exemplary embodiments can avoid the use of an M-G set, switched capacitor bank, power factor compensating equipment, and/or harmonic filter. Certain exemplary embodiments can be used for new excavators or as a retrofit for existing excavators with rotating or static DC drives. The power factor of the system need not be fixed but can be adjusted to minimize voltage fluctuations in mine electric power distribution systems.

[1] Consequently, certain exemplary embodiments can be viewed as providing any of the following:
  i) reduction of the Harmonic Current Distortion to a level better than specified by IEEE 519;
  ii) full regenerative operation;
  iii) high tolerance for line voltage fluctuations;
  iv) improved dynamic performance; and/or
  v) higher availability and/or productivity of the mining excavating equipment;
  vi) etc.

Figure 2:
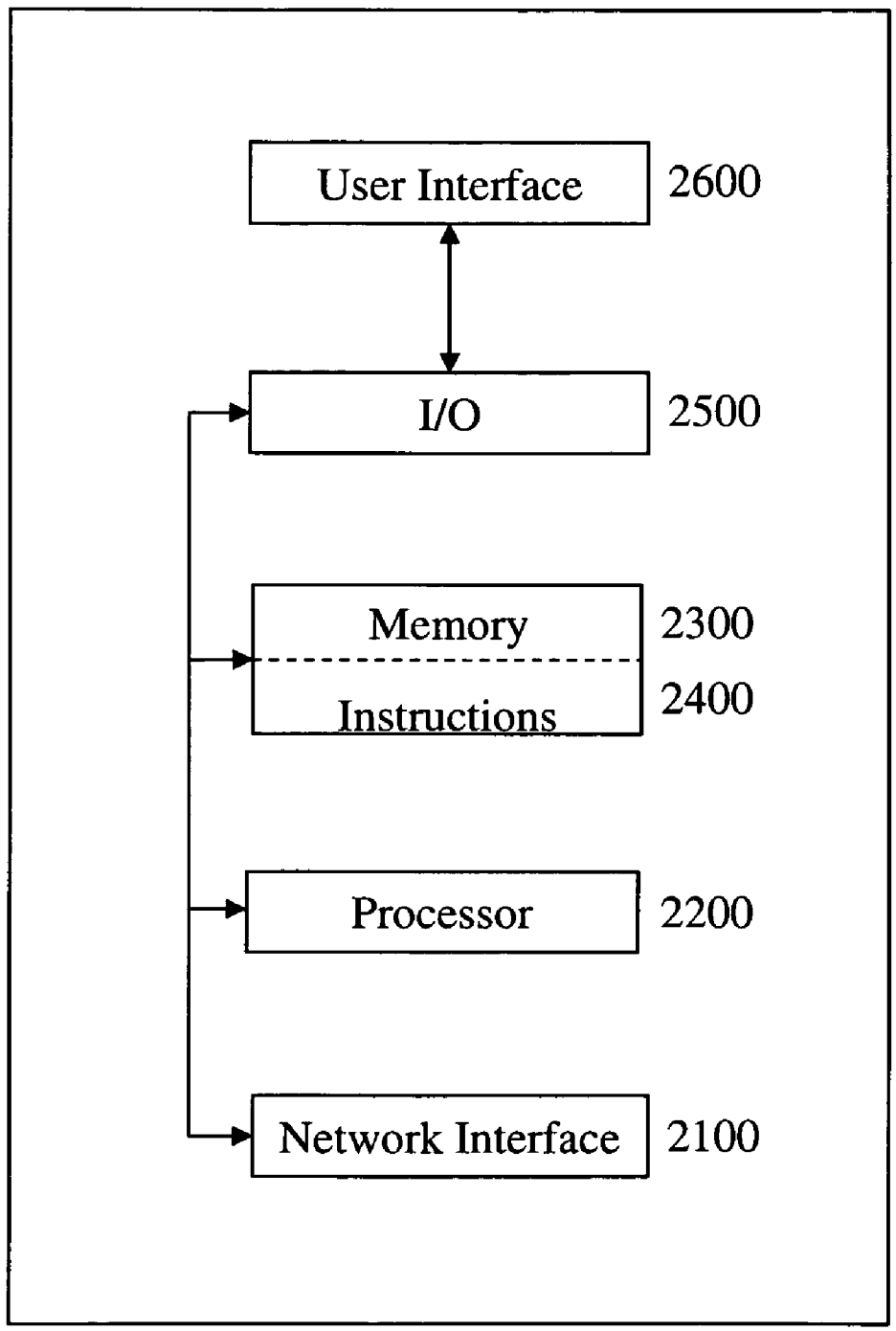
FIG. 2 is a block diagram of an exemplary embodiment of an information device 2000.

FIG. 2 is a block diagram of an exemplary embodiment of an information device 2000, which in certain operative embodiments can comprise, be comprised by, and/or be coupled to, for example, AFE 1300 and/or chopper 1500, 1600 of FIG. 1. Information device 2000 can comprise any of numerous well-known components, such as for example, one or more network interfaces 2100, one or more processors 2200, one or more memories 2300 containing instructions 2400, one or more input/output (I/O) devices 2500, and/or one or more user interfaces 2600 coupled to I/O device 2500, etc.

In certain exemplary embodiments, via one or more user interfaces 2600, such as a graphical user interface, a user can view a rendering of, and/or enter, information related to settings and/or performance of AFE 1300 and/or chopper 1500, 1600. For example, via user interface 2600, a user can determine, receive, monitor, and/or adjust the duty cycle of the DC power output by a user-selected and/or predetermined chopper.

Figure 3:
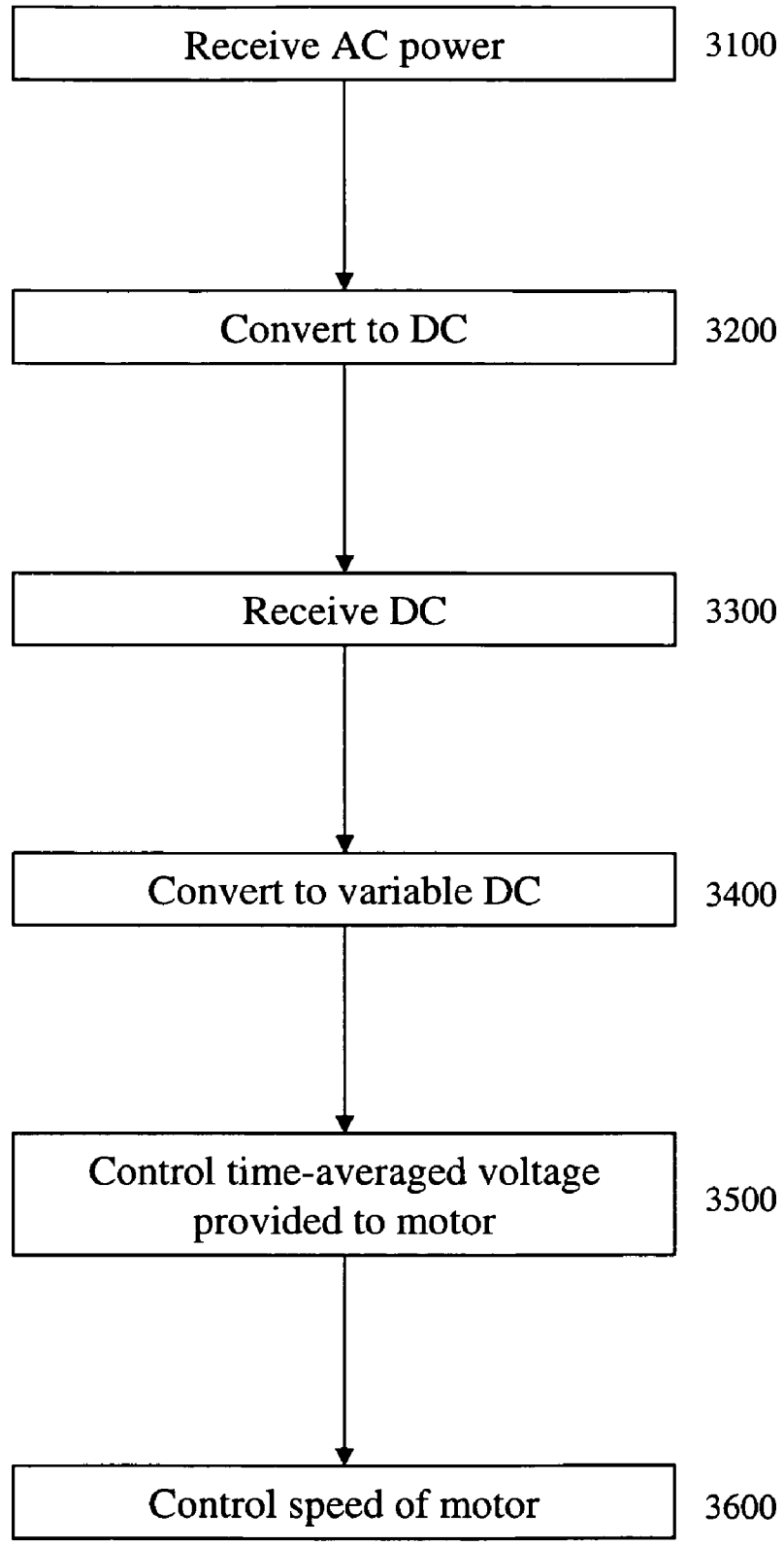
FIG. 3 is a flowchart of an exemplary embodiment of a method 3000.

FIG. 3 is a flowchart of an exemplary embodiment of a method 3000. At activity 3100, AC power can be received, such as at an AFE. At activity 3200, the AC power can be converted to a substantially constant voltage DC power. At activity 3300, the DC power can be received, such as at a DC chopper. At activity 3400, the substantially constant voltage DC power can be converted to pulsed DC power and/or variable DC power. At activity 3500, the time-average voltage provided to a motor can be controlled. At activity 3600, a speed of the motor can be controlled.

Figure 4A:
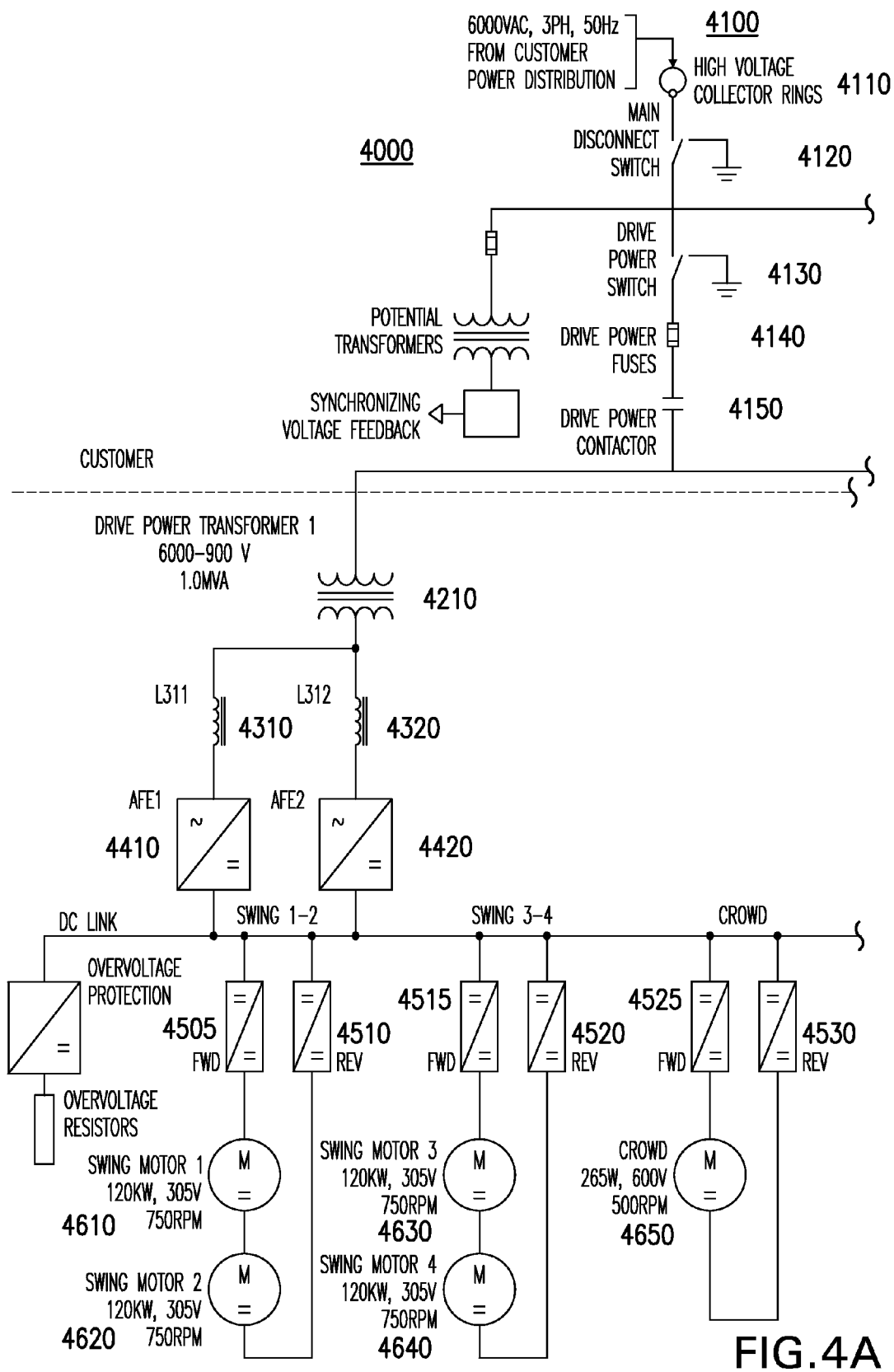
FIG. 4 is a schematic one-line diagram of an exemplary embodiment of a static DC drive system.
Figure 4B:
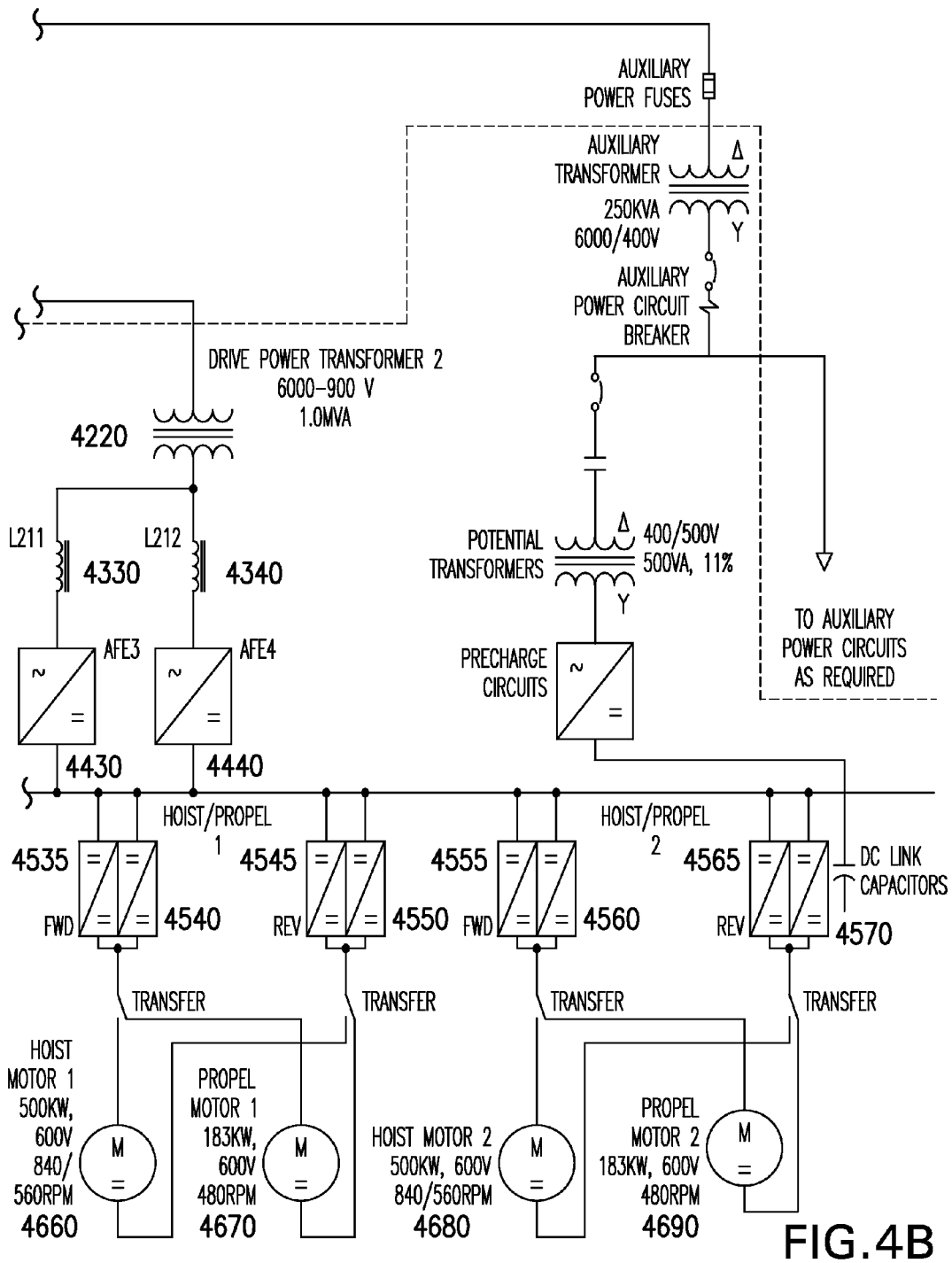

FIG. 4 is a schematic one-line diagram of an exemplary embodiment of a static DC drive system 4000 with an Active Front End (AFE) for a mining shovel with a dipper capacity of 16 cubic meters.

AC power can enter mining machine 4100 through high voltage slip-rings 4110, and can connect to the drive system via the main disconnect switch 4120, the drive power switch 4130, the drive power fuses 4140, and the drive power contactor 4150. The drive power contactor 4150 can supply the primary connections to two main power transformers 4210, 4220. The transformer secondary windings can be connected to four reactors 4310, 4320, 4330, 4340. The four reactors can feed the four Active Front Ends 4410, 4420, 4430, 4440. The Active Front Ends 4410, 4420, 4430, 4440 can take the 3-phase AC line voltage as input and can create a constant voltage DC-bus at their output.

DC choppers 4505, 4510, 4515, 4520, 4525, 4530, 4535, 4540, 4545, 4550, 4555, 4560, 4565, 4570 can take the constant voltage of the DC bus and change it into a variable DC output voltage that can feed the connected DC motors 4610, 4620, 4630, 4640, 4650, 4660, 4670, 4680, 4690. Because the system can be regenerative, there can be DC choppers for both current directions. Depending on the motor voltage, some motors can be connected in series (e.g. this is shown in FIG. 4 for Swing motors 4610, 4620, 4630, 4640).

Swing motors 4610, 4620 can be powered by one forward chopper 4505 and one reverse chopper 4510. Swing motors 4630, 4640 can be powered by one forward chopper 4515 and one reverse chopper 4520.

Crowd motor 4650 can be powered by one forward chopper 4525 and one reverse chopper 4530.

Hoist motor 4660 can be powered by two forward choppers 4535, 4545 and two reverse choppers 4540, 4550. Hoist motor 4680 can be powered by two forward choppers 4555, 4565 and two reverse choppers 4560, 4570.

The output of choppers 4535, 4540, 4545, 4550 can be switched between Hoist motor 4660 and Propel motor 4670. The output of choppers 4555, 4560, 4565, 4570 can be switched between Hoist motor 4680 and Propel motor 4690.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, such as via an explicit definition, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method comprising:
to control a speed of a motor, via an electric drive system comprising a first direct current (DC) chopper and a second DC chopper, providing current to the motor, said second DC chopper in an anti-parallel arrangement with said first DC chopper, said first DC chopper adapted to provide current to said motor in a first current direction, said second DC chopper adapted to provide current to said motor in a second current direction, each of said first DC chopper and said second DC chopper adapted to act as DC voltage regulators.

2. The method of claim 1, further comprising:
via said first DC chopper, generating a Pulse Wave Modulated DC voltage, said first DC chopper comprising:
a plurality of IGBT transistors;
firing circuit to fire the IGBT transistors; and
a digital control circuit.

3. The method of claim 1, further comprising:
via said first DC chopper, generating a Pulse Wave Modulated DC voltage having a variable amplitude.

4. The method of claim 1, further comprising:
via said first DC chopper, generating a continuously variable time-averaged voltage output.

5. The method of claim 1, further comprising:
in association with a variable DC voltage, providing a total harmonic distortion.

6. The method of claim 1, further comprising:
providing a variable power factor associated with a variable DC voltage.

7. The method of claim 1, further comprising:
providing a variable DC voltage.

8. The method of claim 1, further comprising:
Providing a variable DC voltage to said motor.

9. The method of claim 1, wherein:
said motor is a DC propel motor.

10. The method of claim 1, wherein:
said motor is a DC hoist motor.

11. The method of claim 1, wherein:
said motor is a DC swing motor.

12. The method of claim 1, wherein:
said motor is a DC crowd motor.

13. The method of claim 1, wherein:
said motor is a DC drag motor.

14. The method of claim 1, wherein:
said first DC chopper is coupled to an active front end.

15. The method of claim 1, wherein:
Said first DC chopper is coupled to an active front end comprising:
- an input reactor;
- a plurality of IGBT transistors and anti parallel diodes in a bridge configuration;
- a firing circuit to fire the IGBT transistors; and
- a digital control circuit.

16. The method of claim 1, wherein said electric drive system comprises:
no power factor compensation equipment.

17. The method of claim 1, wherein said electric drive system comprises:
no harmonic filters.

18. The method of claim 1, wherein:
said electric drive system is comprised by a mining excavator.

19. The method of claim 1, wherein:
said electric drive system is comprised by a shovel.

20. The method of claim 1, wherein:
the electric drive system is comprised by a drag line.

* * * * *